United States Patent
Mysore et al.

(10) Patent No.: US 7,930,649 B2
(45) Date of Patent: Apr. 19, 2011

(54) METHOD AND SYSTEM FOR SHARING AND MANAGING CONTEXT INFORMATION

(75) Inventors: Sangeeta Mysore, White Plains, NY (US); Charles R. Rich, Northport, NY (US); Ron Even, Fairfield, CT (US)

(73) Assignee: EMC Corporation, Hopkinton, MA (US)

( * ) Notice: Subject to any disclaimer, the term of this patent is extended or adjusted under 35 U.S.C. 154(b) by 1262 days.

(21) Appl. No.: 10/962,031

(22) Filed: Oct. 8, 2004

(65) Prior Publication Data

US 2006/0080662 A1 Apr. 13, 2006

(51) Int. Cl.
*G06F 3/048* (2006.01)

(52) U.S. Cl. .................................. 715/804; 715/781

(58) Field of Classification Search .................. 715/790, 715/781, 804
See application file for complete search history.

(56) References Cited

U.S. PATENT DOCUMENTS

| | | | | |
|---|---|---|---|---|
| 4,794,386 A | * | 12/1988 | Bedrij et al. | 715/803 |
| 5,375,199 A | * | 12/1994 | Harrow et al. | 715/771 |
| 5,963,946 A | * | 10/1999 | Yanagimoto | 707/10 |
| 5,996,003 A | * | 11/1999 | Namikata et al. | 709/205 |
| 6,067,444 A | * | 5/2000 | Cannon et al. | 340/7.44 |
| 6,115,393 A | * | 9/2000 | Engel et al. | 370/469 |
| 6,369,836 B1 | * | 4/2002 | Larson et al. | 715/763 |
| 6,839,680 B1 | * | 1/2005 | Liu et al. | 705/10 |
| 6,980,183 B1 | * | 12/2005 | Rosenberg et al. | 345/87 |
| 7,367,017 B2 | * | 4/2008 | Maddocks et al. | 717/115 |
| 7,451,488 B2 | * | 11/2008 | Cooper et al. | 726/25 |
| 7,711,813 B1 | * | 5/2010 | Yehuda et al. | 709/224 |
| 2002/0071649 A1 | * | 6/2002 | Aoki et al. | 386/8 |

* cited by examiner

*Primary Examiner* — Sara England
(74) *Attorney, Agent, or Firm* — Krishnendu Gupta; Joseph D'Angelo

(57) ABSTRACT

A method and system for managing the presentation or display of information items or context are described. In one aspect of the invention, the method comprises the steps of selecting an entity of a context type associated with a first display, determining at least one second display associated with the context of the selected entity; and making available information associated with the selected entity to each of the determined associated at least one second display. In another aspect of the invention, the method further provides for inhibiting the availability of information associated with the selected entity to a selected one of said determined associated second displays when the selected second display is the same as the first display. An "activate/deactivate" capability is provided such that a display (or window) can be configured to listen to selected context or to stop listening dynamically.

35 Claims, 7 Drawing Sheets

*FIG. 5*

| | COLLECTION | INSTANCE | NOTIFICATION | SUMMARY |
|---|---|---|---|---|
| CONTAINTMENT VIEW | | L | L | |
| MAP VIEW | L | L,S | L | |
| NOTIFICATION LOG VIEW | L | L | S | L |
| NOTIFICATION PROPERTIES VIEW | | L | L | |
| STATUS TABLE VIEW | S | S | | |
| SUMMARY VIEW | L | | | S |

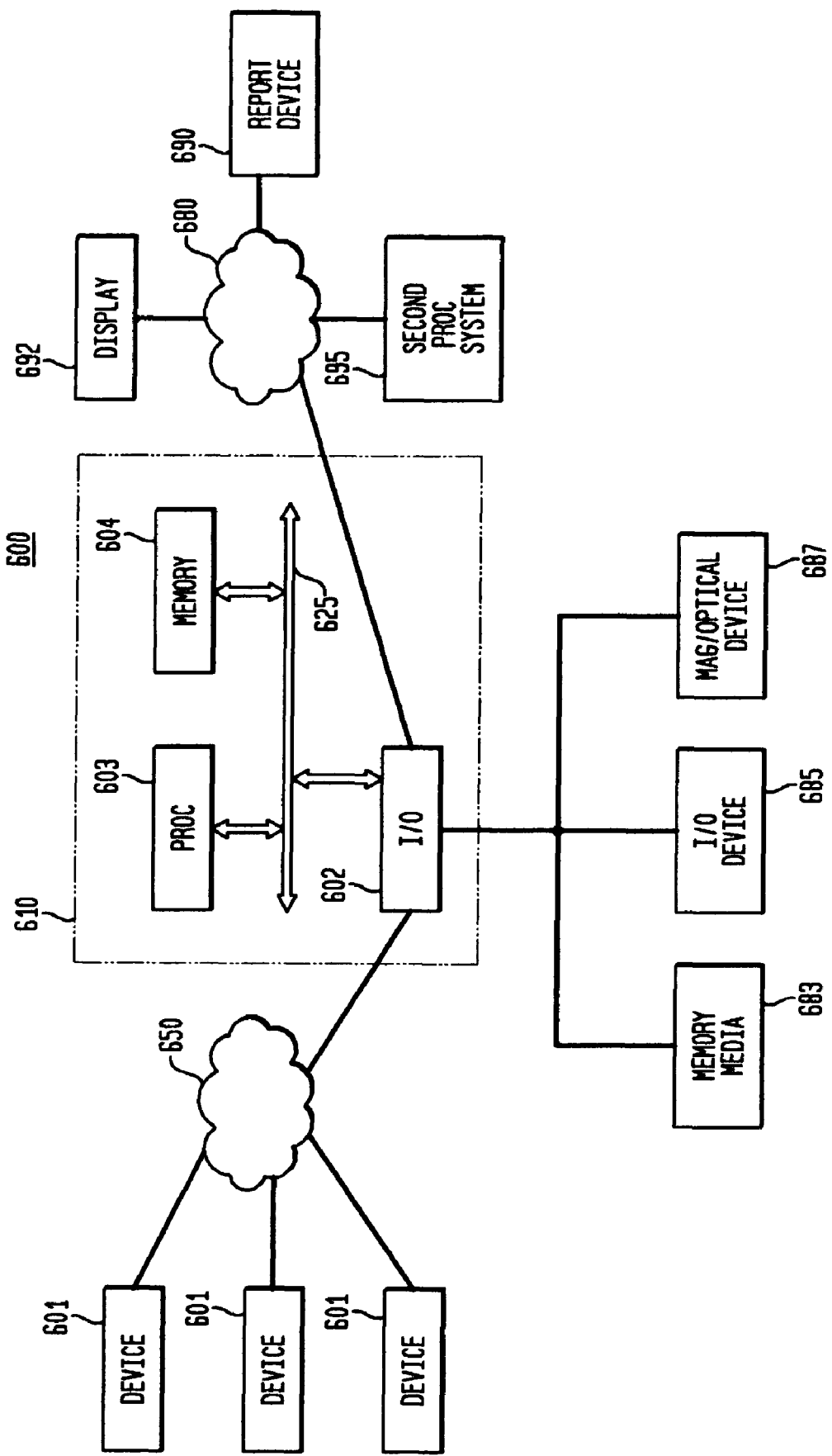

METHOD AND SYSTEM FOR SHARING AND MANAGING CONTEXT INFORMATION

FIELD OF THE INVENTION

The present invention is related to the field of graphical interfaces, and more particularly, presenting and sharing information and managing the presentation of such information.

BACKGROUND OF THE INVENTION

As computer networks, and the applications that run on them, continue to expand through the addition of new elements or the acquisition or incorporation of other networks, it becomes significantly more difficult to monitor and display the information or many interactions, referred to herein as information, that may occur among the network elements and the applications they support.

System administrators utilize a graphical user interface (GUI) to display properties of one or more network parameters, such as notifications, network maps, configurations, etc. With current interfaces, as elements are selected, information or context regarding the selected element is displayed in a new "window." In this case, "window" refers to a section on a computer screen, typically rectangular, in which images are outputted by application programs and the terms "window" and "display," when used as a noun, are used interchangeably herein. Windows can be displayed, moved around or resized. These windows can display a visual representation of an analysis that was performed on a set of elements in the network. The analysis may show items such as status, state, performance, availability metrics and relationship to other adjacent elements. Often a user would create different visual representations of an analysis or a dataset, perhaps graphically as a pie chart in one window, a table in a second window and as a topology map in a third window. Multiple visual representations are advantageous as users may utilize concurrent multiple displays to inspect a common set of network elements in order to rapidly come to a conclusion and if necessary, take action.

As the user interacts with one of the displayed windows it would also be valuable if the other windows automatically adjusted themselves to remain focused on the same set of elements the user is inspecting.

However, the multiple windows necessary to see this multi-dimensional view are typically displayed over already existing windows and the information in the existing windows is obstructed and no longer readable. The operator, desiring to read or review information in a blocked window, is required to move or minimize the one or more windows that are blocking the display containing the desired information. This continuous scaling of the windows or displays to view desired information presents a significant burden on the operator, as continuous monitoring of large networked systems is necessary.

Further, similar information may be accessed through different windows presentations and, thus, duplicative information is contained in separate windows. The presentation of the same information in different windows is confusing, burdensome, a waste of resources and screen real-estate. Further such presentation requires unnecessary keystrokes and time for the user to synchronize the multiple display windows.

Further, the reduced visibility of information in obstructed windows may result in a failure of identifying critical information needed to analyze and prevent a potential failure in the network. Still more, it requires unnecessary keystrokes and time for the user to synchronize these multiple windows.

Hence, there is a need in the industry for a method and system that simplifies the process of accessing and displaying information or data associated with a large number of entities and enabling simultaneous alternative views of this information to stay in synchronization with each other.

BRIEF SUMMARY

A method and system for managing the presentation or display of information items are described. In one aspect of the invention, the method comprises the steps of selecting an entity of a context type in a first display, determining at least one second display associated with the context of the selected entity and making information associated with the selected entity in the first display available to each of the associated displays. In another aspect of the invention, the method further provides for inhibiting the availability of the information associated with the selected entity to a selected one of the determined associated second displays when the selected second display is the same as the first display. In still another aspect of the invention, the method provides for inhibiting the display of the information associated with the selected entity when the associated second display is the same as the first display. Further a display (or window) can be configured to listen to selected context or to stop listening dynamically.

BRIEF DESCRIPTION OF THE DRAWINGS

FIG. 5 illustrates an organizational chart for associating context and views; and FIG. 6 illustrates a system for executing the processing shown herein.

Figure 1:
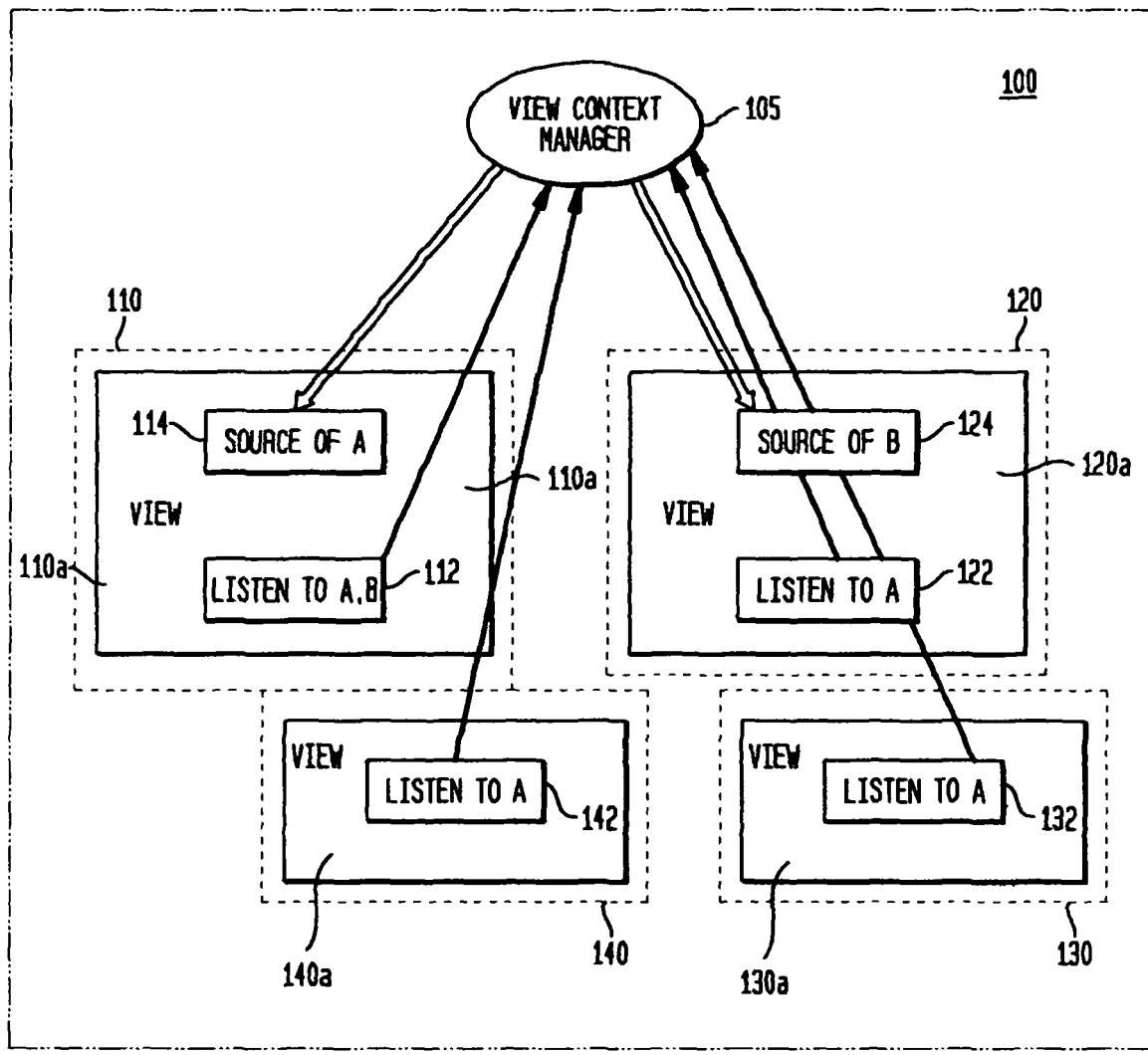
FIG. 1 illustrates a block diagram for context sharing in accordance with the principles of the invention.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 1 illustrates a block diagram 100 for associating and managing, information, information items or context in accordance with the principles of the invention. In this illustrative processing, window 110 includes view 110a, which represents both a source view 114 and a destination view 112. Similarly, display window 120 includes view 120a, which represents both a source view 124 and a destination view 122. Also shown are display windows 130 and 140, which contain views 130a and 140a, respectively. Views 130a and 140a include destination views 132 and 142, respectively. Source views 114 and 124 represent sources information or context associated with entities of a selected context type. Views 112, 122, 132 and 142 represent context destination or listening views that receive and display information associated with selected entities of a selected context type. Although not shown, it would be understood that the illustrated windows may similarly contain a plurality of source or destination views.

View Context Manager (VCM) 105 is shown receiving information and indications of information from source views 114 and 124 and further providing or distributing information associated with selected entities of a selected context type to one or more of listening views 112, 122, 132 and 142 as will more fully be explained.

Figure 2A:
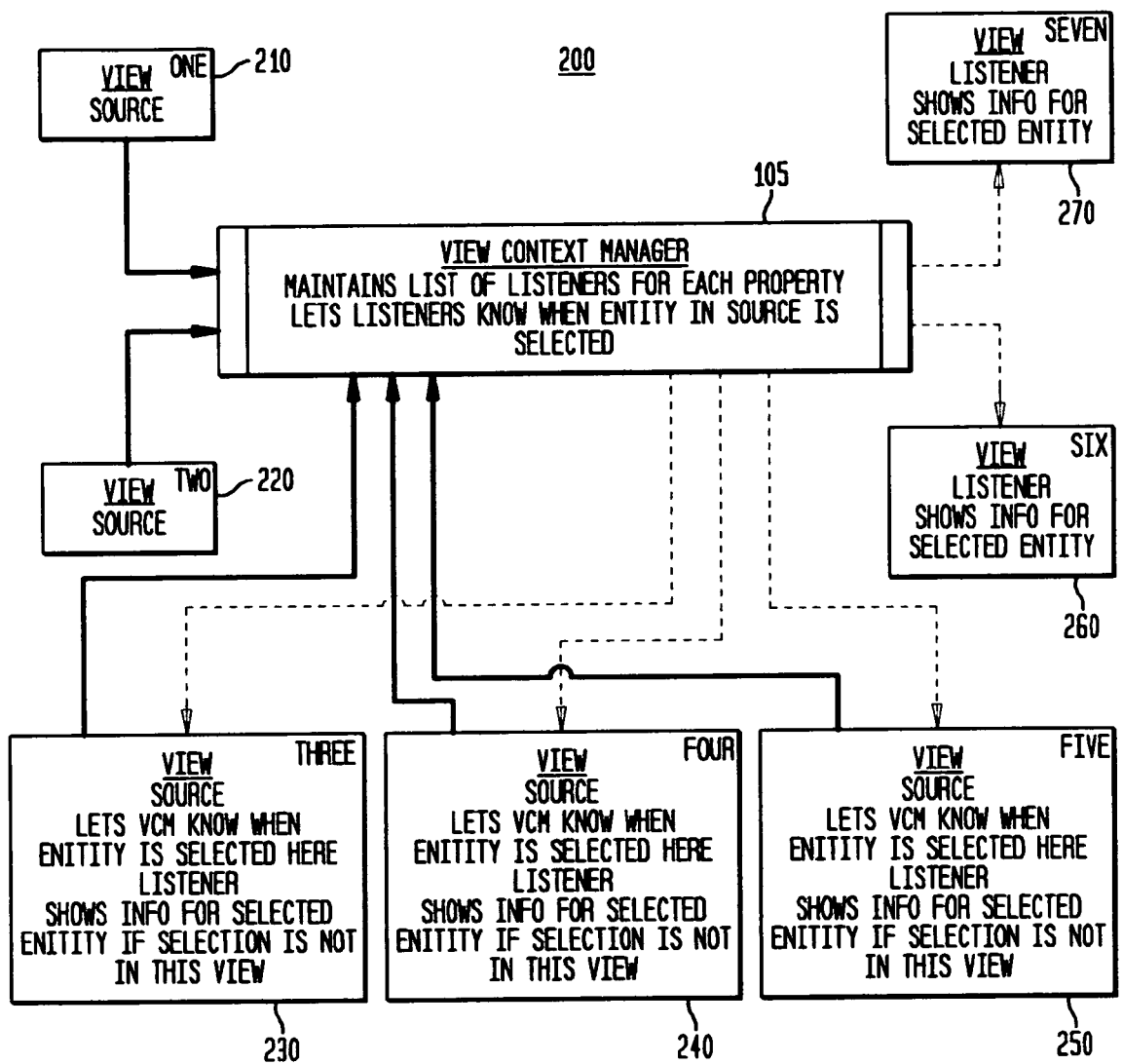
FIG. 2a illustrates a flow diagram for context sharing in accordance with the principles of the invention.

FIG. 2a illustrates a flow diagram of an exemplary process for of context sharing in accordance with the principles of the invention. In this exemplary process view, ONE, 210, and view TWO, 220 are designated or selected as source views and an indication of their selection is provided to VCM 105. In the designation of a view as a source view, one or more parameters or entities may be selected from within the designated view and information or context associated with the selected parameters or entities provided to the VCM 105 for subsequent reporting to an associated destination view. In one aspect of the invention, all views may be automatically selected as source views. In another aspect of the invention, views may be individually designated or selected, or deselected, as source views and/or listening (i.e., destination) views Further illustrated are views SIX 260 and SEVEN, 270, which are selected as destination or listening views suitable for displaying, tracking or recording information items or context provided by VCM 105. View THREE, 230, view FOUR, 240 and view FIVE 250 are designated or selected as both listener views and source views, which are suitable for receiving information items provided by VCM 105 and further providing information regarding one or more selected entities to VCM 105, respectively.

VCM 105, upon receiving information or context associated with selected entities of selected context type from designated source views, maintains a list for each selected source parameter or entity and determines at least one associated listening or destination view for which to provide the received information. For example, FIG. 2a illustrates that information provided by source view ONE, 210 and source view FOUR, 240, may be provided to listening view SEVEN, 270, and information or context provided by source view TWO, 220 and source view THREE, 230, may be provided to view FOUR, 240. Also shown is that a view may be both a source and a destination view. Hence, information regarding a selected entity is not made available to, or displayed by, a destination view that is the source of the information. Thus, information provided by source view THREE, 230 may be provided to one or more of the listening views FOUR, 240, FIVE, 250, SIX 260 and/or SEVEN, 270, but not to view THREE, 230.

In one aspect of the invention, determination of the display of information associated with a selected entity of a context type may be centralized in that VCM 105 may determine whether information provided by a source view may be made available to the same view operating as a listening view. In another aspect of the invention, VCM 105 may provide the information associated with the selected entity to each associated listening view and the listening view determines whether the information may be displayed.

Although, the above example illustrates that the information provided by source view THREE 230, for example, may be provided to listening views 240-270, one skilled in the art would recognize that the information provided may only be viewed if an associated listening view is viewable, i.e. the destination view is displayed within a display window.

Figure 2B:
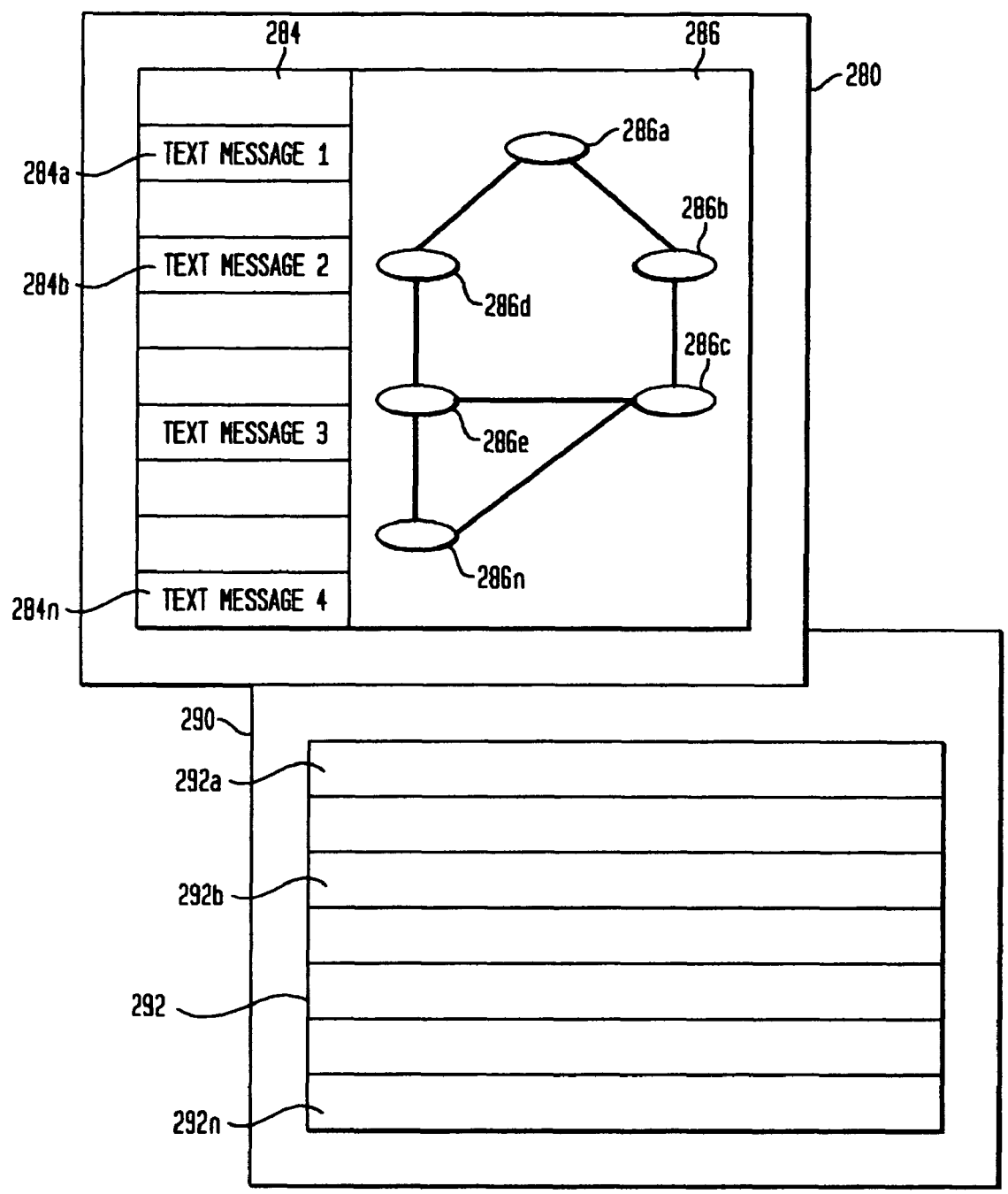
FIG. 2b illustrates a graphical user interface window for selecting context parameters in accordance with the principles of the invention

FIG. 2b illustrates an exemplary graphical user interface display 280 for selecting entities of a context type in accordance with the principles of the invention. In this illustration, window 280 is shown containing two source views 284 and 286. View 284 includes conventional text messages 284a-284n, whereas view 286 includes a map of network nodes 286a-286n. Display window 290 includes a selected or assigned destination view 292, designated to receive or listen to specific context. View 292 provides for the display of information, e.g., text messages, associated with the selected entities provided by source views 284 and/or 286. In this case, entities associated with a context type may be selected by highlighting one or more messages in view 284 or by highlighting one or more network nodes in view 286. Highlighting of an item in a graphical user interface is well-known in the art, e.g., "point&click," and need not be discussed in detail herein.

Figure 3:
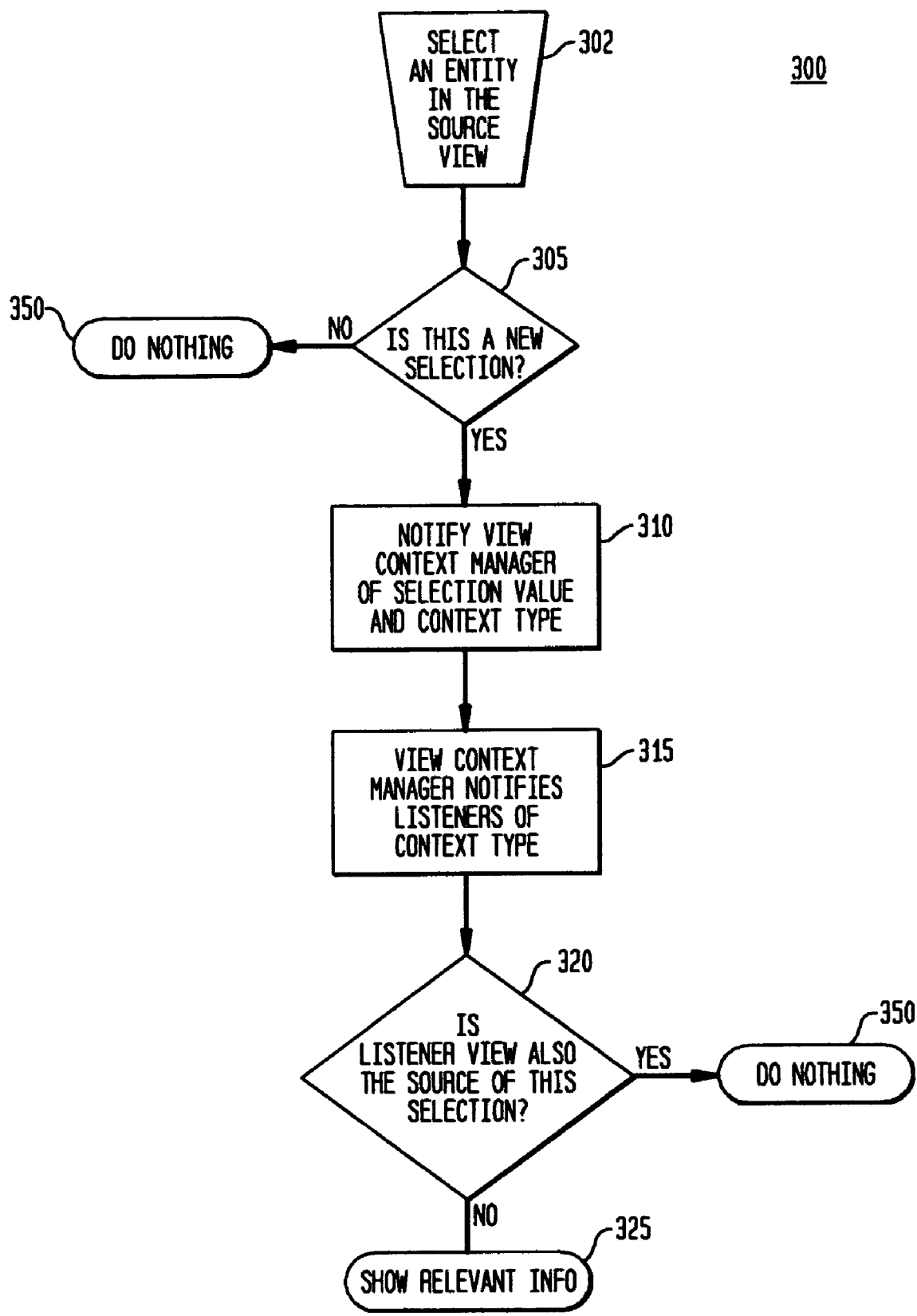
FIG. 3 illustrates a flow chart of an exemplary process for context sharing in accordance with the principles of the invention.

FIG. 3 illustrates a flow chart 300 of an exemplary process for managing and distributing context in accordance with the principles of the invention. In this illustrated process, an entity is selected in a source view, at block 302. At block 305, a determination is made whether the selected entity is a new selection. If the answer is negative, then processing is completed and program control proceeds to block 350. However, if the answer is in the affirmative, then the VCM 105 (FIG. 1) is provided, at block 310, with information or parameters associated with the selected entity, e.g., value and context type. At block 315, VCM 105 provides the received information to listening views associated with the selected entity. At block 320, a determination is made whether the associated listening view(s) is (are) also the source of the information. If the answer is in the affirmative, then processing is completed and program control proceeds to block 350. However, if the answer is negative, then the information associated with the selected entity is made available to the associated listening view(s) at block 325, for subsequent display.

Figure 4:
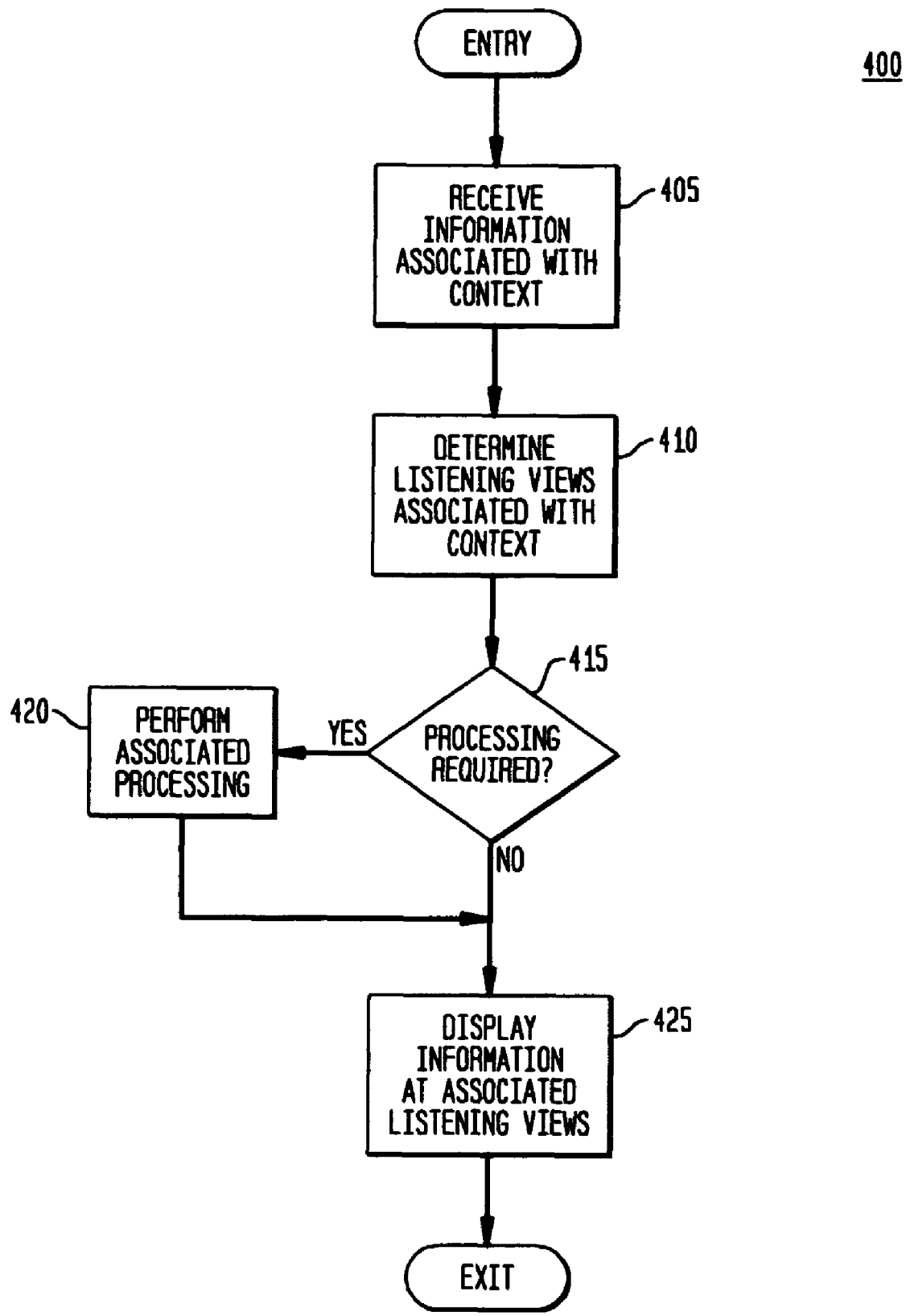
FIG. 4 illustrates a flow chart of an exemplary process for managing context in accordance with the principles of the invention.

FIG. 4 illustrates a flow chart 400 of an exemplary process for managing context in accordance with the principles of the invention. In this illustrated process, information associated with a selected entity of a selected context type is received at block 405. At block 410, listening views associated with the context type of the selected entity are determined. At block 415, a determination is made whether processing of the information associated with the selected entity is required. If the answer is in the affirmative, then the associated processing is determined and performed at block 420. The information associated with the selected entity, is then distributed to the associated listening views at block 425. However, if the answer at block 410 is negative, then the information associated with the selected entity is distributed to the associated listening views at block 425.

In one aspect of the invention (not shown), VCM 105 may inhibit making available the information associated with the selected entity to listening views when it is determined that the listening view is the same view as the source of the selected entity. In another aspect of the invention (not shown), each listening view, e.g., views 110, 120 (FIG. 1), may inhibit display of information received or which has been made available when it is determined that that the destination view is also the source of the selected entity.

FIG. 5 illustrates an example of associating information associated with a selected entity to a listening view. In this exemplary two-dimensional association matrix, context or context types are represented horizontally in row 510, and views are represented vertically in column 550. In this example, four context types are shown along with six views. The context types are referred to as "collection", "instance", "notification" and "summary." The views are referred to as "containment," "map," "notification," "notification property," "status table," and "summary."

The intersection of the rows and columns of the context types and the views represents, and defines, the association of context types and views. The matrix may also determine whether a view is a source of a selected entity of a known context type, a listener of the selected entity or both. For example, in the exemplary association chart shown in FIG. 5, the "containment" view is designated as a listening view to selected entities of an "instance" or "notification" context type. Similarly, the "status table" view may be a source of an entity of the "collection" or the "instance" context type. In this exemplary case, selection of an entity associated with an "instance" context type from the "status table" view may be made available to each of the "containment," "map," "notification log" and "notification property" views.

Similarly, the "notification log" view is shown as a source of "notification" context and a listener of entities associated with the "collection," "instance" and "summary" context types. In this case, selection of a entity of a "notification" context type in a "notification log" view, for example, will allow information associated with the selected entity to be made available to the "containment," "map" and "notification property" views.

Although, the present invention has been shown with regard to context types and the views that are predetermined, one skilled in the art would understand that the number and types of context types and views may be easily expanded to include additional context types and views. Such expansion of the principles of the invention described herein has be contemplated and considered to be within the scope of the invention.

In another aspect of the invention, whether the availability of information associated with a selected entity is provided to a destination view may be conditioned on the status of the destination view. For example, in addition to the context type/view organization shown in FIG. 5 for determining whether information is made available to a destination view, VCM 105 may further determine whether, or be informed that, the desired destination or listening view is in an active state. In this aspect, information is only made available to active associated destination views. In still another aspect, VCM 105 may make the information to the destination view and the destination view may determine whether it is in an active state to display the information. Activation/deactivation of a destination view may be predetermined or under a user control.

FIG. 6 illustrates an exemplary embodiment of a system or apparatus 600 that may be used for implementing the principles of the present invention. System 600 includes processing unit 610 that may contain one or more input/output devices 602, processors 603 and memories 604. I/O devices 602 may access or receive information from one or more sources or devices 601. Sources or devices 601 may be devices such as routers, servers, computers, notebook computer, PDAs, cells phones or other devices suitable for transmitting and receiving information responsive to the processes shown herein. Devices 601 may have access over one or more network connections 650 via, for example, a wireless wide area network, a wireless metropolitan area network, a wireless local area network, a terrestrial broadcast system (Radio, TV), a satellite network, a cell phone or a wireless telephone network, or similar wired public networks, such as POTS, INTERNET, LAN, WAN and/or private networks, e.g., INTRANET, as well as portions or combinations of these and other types of networks. Network 650 may similarly represent a communication bus, such as PCI, USB, Firewire, etc.

Input/output devices 602, processors 603 and memories 604 may communicate over a communication medium 625. Communication medium 625 may represent, for example, a bus, a communication network, one or more internal connections of a circuit, circuit card or other apparatus, as well as portions and combinations of these and other communication media. Input data from the devices 601 is processed in accordance with one or more programs that may be stored in memories 604 and executed by processors 603. Memory 604 may be selected preferably from semiconductor memories such as a Read-Only Memory (ROM), a Programmable ROM, a Random Access Memory, which is accessible through medium 625 or may be a cache memory in direct communication with processors 603. Processors 603 may be any means, such as general purpose or special purpose computing system, such as a laptop computer, desktop computer, a server, handheld computer, or may be a hardware configuration, such as dedicated logic circuit, or integrated circuit. Processors 603 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In a one aspect, the processes shown herein may be represented by computer readable code stored on a computer readable medium. The code may also be stored in the memory 604. The code may be read/downloaded from a memory medium 683, an I/O device 685 or magnetic or optical media, such as a floppy disk, a CD-ROM or a DVD, 687. The downloaded computer readable code may be stored in memory 604 or executed directly by processor 603.

Information from device 601 received by I/O device 602, after processing in accordance with one or more software programs operable to perform the functions illustrated herein, may also be transmitted over network 680 to one or more output devices represented as display 692, reporting device 690, e.g., printer, or second processing system 695. Network 680 may be physically the same as network 650 or may be a different network that operates on the same or different communication principles as that of network 650.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for managing and viewing information associated with entities of a context type of properties of a computer network among a plurality of display views on a single display, the entities of the context type of the computer network comprising elements of the computer network, the method comprising the steps of:
    selecting an entity of a context type associated with a first display view on the single display; wherein the first context type corresponds to information regarding the properties of the computer network;
    receiving, in a view context manager communicatively coupled to the display views, information from the selected entity on the single display on the first computer; wherein the view context manager maintains a list of source parameters and entities of the context types of the properties of the computer network;
    determining in the view context manager at least one second display view, displayable on the single display, associated with the selected entity; and
    excluding all of the entities associated with the view corresponding to the selected entity from being displayed on the at least one second display view;
    enabling a subsequent selection of an entity of a context type associated with the at least one second display view;
    receiving, in the view context manager communicatively coupled to the display views, information from the subsequently selected entity on the at least one second display on the first computer; wherein the view context manager maintains a list of source parameters and entities of the context types of the properties of the computer network;
    determining in the view context manager at least one other display view, displayable on the single display, associated with the subsequently selected entity of the selected second display view; and
    excluding all of the entities associated with the view corresponding to the subsequently selected entity of the second display view from being displayed on the other display views.

2. The method as recited in claim 1, wherein the first and second display views are associated with independent display windows.

3. The method as recited in claim 1, wherein the first and second display views are associated with a same display window.

4. The method as recited in claim 3, wherein said first and second display views are non-overlapping.

5. The method as recited in claim 1, further comprising the step of:
    dynamically activating said determined second display view.

6. The method as recited in claim 1, further comprising the step of:
    inhibiting the display of information associated with the selected entity when said determined second display view is not active.

7. The method as recited in claim 6, further comprising the step of:
    dynamically activating said determined second display view.

8. The method of claim 1 wherein the view context manager determines at least one associated listening or destination view for each entity of the entities of the context types.

9. A system for managing and viewing information associated with entities of a context type of properties of a computer network among a plurality of display views on a single display, the entities of the context type of the computer network comprising elements of the computer network, the system comprising:
    a processor in communication with a memory, the processor executing code for:
    selecting an entity associated with a context type associated with a first display view on the single display; wherein the first context type corresponds to information regarding the properties of the computer network;
    receiving, in a view context manager communicatively coupled to the display views, information from the selected entity; on the single display on the first computer; wherein the view context manager maintains a list of source parameters and entities of the context types of the properties of the computer network;
        determining in the view context manager at least one second display view, displayable on the single display, associated with the selected entity; and
    excluding all of the entities associated with the view corresponding to the selected entity from being displayed on the at least one second display view;
    enabling a subsequent selection of an entity of a context type associated with the at least one second display view;
    receiving, in the view context manager communicatively coupled to the display views, information from the subsequently selected entity on the at least one second display on the first computer; wherein the view context manager maintains a list of source parameters and entities of the context types of the properties of the computer network;
    determining in the view context manager at least one other display view, displayable on the single display, associated with the subsequently selected entity of the selected second display view; and
    excluding all of the entities associated with the view corresponding to the subsequently selected entity of the second display view from being displayed on the other display views.

10. The system as recited in claim 9, wherein the first and second display views are associated with independent display windows.

11. The system as recited in claim 9, wherein the first and second display views are associated with a same display window.

12. The system as recited in claim 11, wherein said first and second display views are non-overlapping.

13. The system as recited in claim 9, further comprising:
    an input/output device in communication with the processor.

14. The system as recited in claim 9, wherein the code is stored in the memory.

15. The system as recited in claim 9, wherein information associated with the selected entity is provided to a second processing system.

16. The system as recited in claim 9, wherein the processor further executing code for:
    activating said determined second display view.

17. The system as recited in claim 16, wherein the processor further executing code for:
    accepting an input to activate said determined second display view.

18. The system as recited in claim 9, wherein the processor further executing code for:

inhibiting the display of information associated with the selected entity when said determined second display view is not active.

19. The system as recited in claim 18, wherein the processor further executing code for:
 activating said determined second display view.

20. The system as recited in claim 19, wherein the processor further executing code for:
 accepting an input to activate said determined second display view.

21. The system of claim 9 wherein the view context manager determines at least one associated listening or destination view for each entity of the entities of the context types.

22. An apparatus for managing and viewing information associated with entities of a context type of properties of a computer network among a plurality of display views on a single display, the entities of the context type of the computer network comprising elements of the computer network, the apparatus comprising:
 a processor in communication with a memory, the processor executing code for:
 selecting an entity of a context type associated with a first display view on the single display; wherein the first context type corresponds to information regarding the properties of the computer network;
 receiving, in a view context manager communicatively coupled to the display views, information from the selected entity on the single display on the first computer; wherein the view context manager maintains a list of source parameters and entities of the context types of the properties of the computer network;
 determining in the view context manager at least one second display view, displayable on the single display, associated with the selected entity; and
 excluding all of the entities associated with the view corresponding to the selected entity from being displayed on the at least one second display view;
 enabling a subsequent selection of an entity of a context type associated with the at least one second display view;
 receiving, in the view context manager communicatively coupled to the display views, information from the subsequently selected entity on the at least one second display on the first computer; wherein the view context manager maintains a list of source parameters and entities of the context types of the properties of the computer network;
 determining in the view context manager at least one other display view, displayable on the single display, associated with the subsequently selected entity of the selected second display view; and
 excluding all of the entities associated with the view corresponding to the subsequently selected entity of the second display view from being displayed on the other display views.

23. The apparatus as recited in claim 22, wherein the the second display view and the first display view are contained in a single display window.

24. The apparatus as recited in claim 23, wherein the the second display view and the first display view are non-overlapping.

25. The apparatus of claim 22 wherein the view context manager determines at least one associated listening or destination view for each entity of the entities of the context types.

26. Computer readable code stored on a computer readable storage medium for managing and viewing information associated with entities of a context type of properties of a computer network among a plurality of display views on a single display, the entities of the context type of the computer network comprising elements of the computer network, the code suitable for:
 selecting an entity associated with a context type associated with a first display view on the single display; wherein the first context type corresponds to information regarding the properties of the computer network;
 receiving, in a view context manager communicatively coupled to the display views, information from the selected entity; on the single display on the first computer; wherein the view context manager maintains a list of source parameters and entities of the context types of the properties of the computer network;
 determining in the view context manager at least one second display view, displayable on the single display, associated with the selected entity; and
 excluding all of the entities associated with the view corresponding to the selected entity from being displayed on the at least one second display view;
 enabling a subsequent selection of an entity of a context type associated with the at least one second display view;
 receiving, in the view context manager communicatively coupled to the display views, information from the subsequently selected entity on the at least one second display on the first computer; wherein the view context manager maintains a list of source parameters and entities of the context types of the properties of the computer network;
 determining in the view context manager at least one other display view, displayable on the single display, associated with the subsequently selected entity of the selected second display view; and
 excluding all of the entities associated with the view corresponding to the subsequently selected entity of the second display view from being displayed on the other display views.

27. The computer readable code as recited in claim 26, wherein the first and second display views are associated with independent display windows.

28. The computer readable code as recited in claim 26, wherein the first and second display views are associated with a same display window.

29. The computer readable code as recited in claim 28, wherein said first and second display views are non-overlapping.

30. The computer readable code as recited in claim 26, further containing code thereon suitable for:
 activating said determined second display view.

31. The computer readable code as recited in claim 30, further containing code thereon suitable for:
 accepting an input to activate said determined second display view.

32. The computer readable code as recited in claim 30, further containing code thereon suitable for:
 inhibiting the display of information associated with the selected entity when said determined second display view is not active.

33. The computer readable code as recited in claim 32, further containing code thereon suitable for:
    activating said determined second display view.

34. The computer readable code as recited in claim 33, further containing code thereon suitable for:
    accepting an input to activate said determined second display view.

35. The computer readable code of claim 26 wherein the view context manager determines at least one associated listening or destination view for each entity of the entities of the context types.

* * * * *